Aug. 5, 1947.   C. A. BLAKESLEE   2,425,080
PLURAL MAGNITUDE RECORDER
Filed Jan. 7, 1943   3 Sheets-Sheet 1

INVENTOR.
CLINTON A. BLAKESLEE
BY
E. C. Sanborn
Attorney

Aug. 5, 1947.    C. A. BLAKESLEE    2,425,080
PLURAL MAGNITUDE RECORDER
Filed Jan. 7, 1943    3 Sheets-Sheet 2
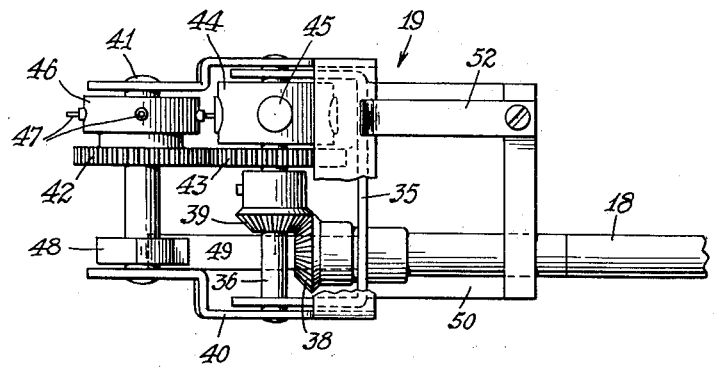
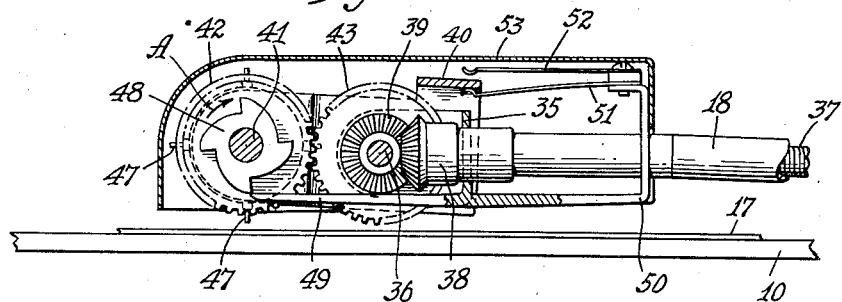
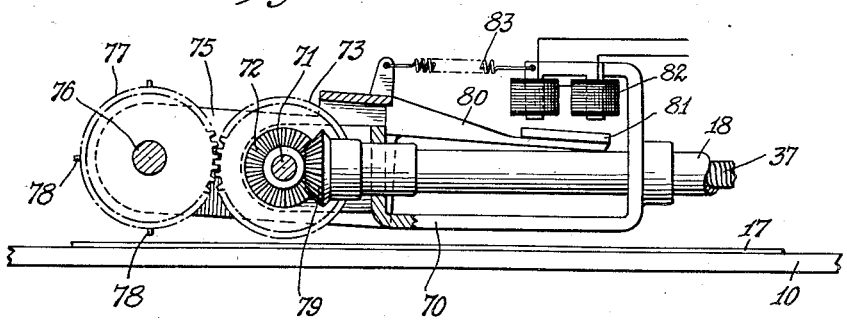
INVENTOR.
CLINTON A. BLAKESLEE
BY
E. C. Sanborn
Attorney Aug. 5, 1947.                  C. A. BLAKESLEE                    2,425,080
                            PLURAL MAGNITUDE RECORDER
                            Filed Jan. 7, 1943           3 Sheets-Sheet 3
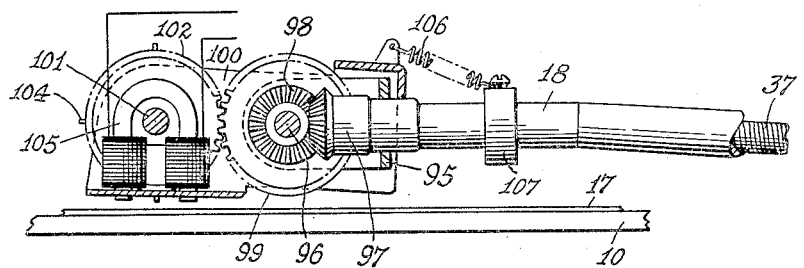
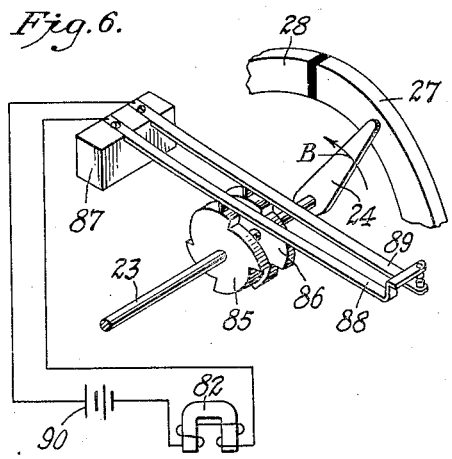
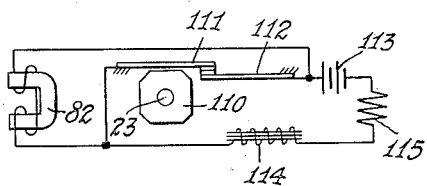
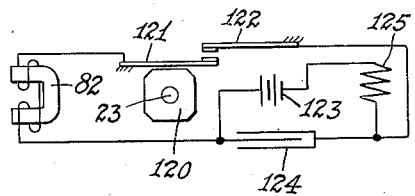
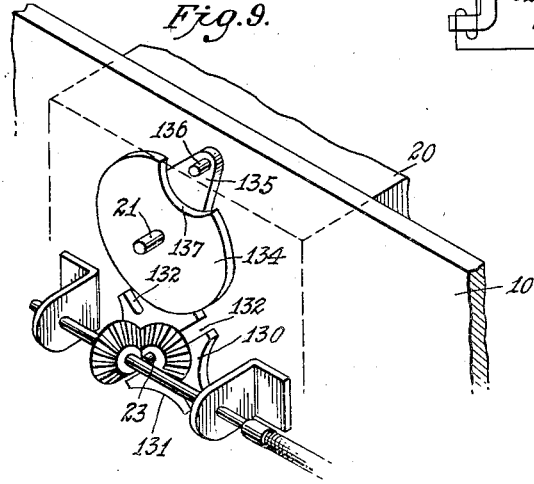
INVENTOR.
CLINTON A. BLAKESLEE
BY
E. C. Sanborn
Attorney Patented Aug. 5, 1947

2,425,080

UNITED STATES PATENT OFFICE 2,425,080

PLURAL MAGNITUDE RECORDER

Clinton A. Blakeslee, Waterbury, Conn., assignor to The Bristol Company, Waterbury, Conn., a corporation of Connecticut.

Application January 7, 1943, Serial No. 471,554

9 Claims. (Cl. 234—66)

This invention relates to recording instruments, and more particularly to an instrument adapted to the successive measurement of a plurality of similar magnitudes with a view to recording on a common chart and to common coordinates, a graphical representation of the values attained by said magnitudes over an extended period of time. It is primarily concerned with the provision of means correlated with the measurement of values of a plurality of magnitudes for effectively and expeditiously enabling said values to be recorded on a circular chart.

For the purposes of imprinting charts with a plurality of records, there have been developed a number of instruments and devices adapted to use with charts having rectangular coordinates. Examples of such devices will be found in U. S. Letters Patent No. 1,125,699, issued to M. E. Leeds, January 19, 1915; and 2,125,345, issued to O. H. Hunt, August 2, 1938. It will be obvious that in an instrument adapted for providing a record on a chart having rectangular coordinates, and in which the recording member may be carried upon a track, there is no great limitation imposed upon the mass of the recording member or upon the weight to be moved as the member assumes its various recording positions. It will also be obvious that the use of a parallel track permits utilization of a splined shaft or a depressor bar or other simple means to provide a transfer of motion from the main operating mechanism of the instrument to the recording mechanism which is subject to translation in accordance with changes in the value of the measured magnitude. In instruments of the circular chart type it is commonly found expedient for the recording element to be carried on one extremity of an extended cantilever arm which deflects through a limited angle about an axis near the other extremity. In the common form of circular-chart instruments the recording member takes the form of a pen or stylus which inscribes on the chart a record whose ordinates are in the form of arcs having a radius equal to the distance along the arm between the stylus and the axis of deflection.

It is an object of the present invention to provide a multiple point recording element adapted to be carried by the free extremity of the arm of a circular chart instrument and to imprint on the chart thereof a plurality of independent records representing successive values attained by corresponding independent magnitudes measured by said instrument.

It is a further object to provide a recording element of the above nature in which the mechanism for changing from one record to another shall not interfere with the free deflection of the extended arm.

It is a further object to provide a device of the above nature in which the function of making the record shall not interfere with the free action of the measuring element.

It is a further object to provide a device of the above nature in which the recording mechanism shall not interfere with free access to the chart for examining or changing the same.

The invention also comprises other features which will be hereinafter described and claimed. While the invention has been developed in conjunction with the circular chart type of recording instrument, some of its features are not restricted in utility to instruments of that type, as will be apparent from the ensuing description.

In carrying out the chief objects of the invention it is proposed to provide a recording head adapted to be mounted upon, and carried by, the deflecting arm of a circular chart instrument and having shiftable printing means identifiable by color or otherwise, together with means for progressively advancing said printing means in synchronism with a connection-changing device in the body of the instrument, and further means for periodically and momentarily bringing said printing means in engagement with the surface of the chart.

In the drawings:

Fig. 2 is a front elevation to an enlarged scale of a recording head adapted to the purposes of the invention.

Fig. 3 is a side elevation partly in section, of the same.

Figs. 4 and 5 are side elevations of recording heads generally similar to that shown in Figs. 2 and 3, but differing therefrom in their methods of operation.

Fig. 6 is a representation of electrical means adapted to the actuation of the devices shown in Figs. 4 and 5.

Figs. 7 and 8 are alternative electrical systems for the same purpose as that shown in Fig. 6.

Fig. 9 is a perspective representation of an alternative embodiment of certain parts of the mechanism shown in Fig. 1.

Figure 1:
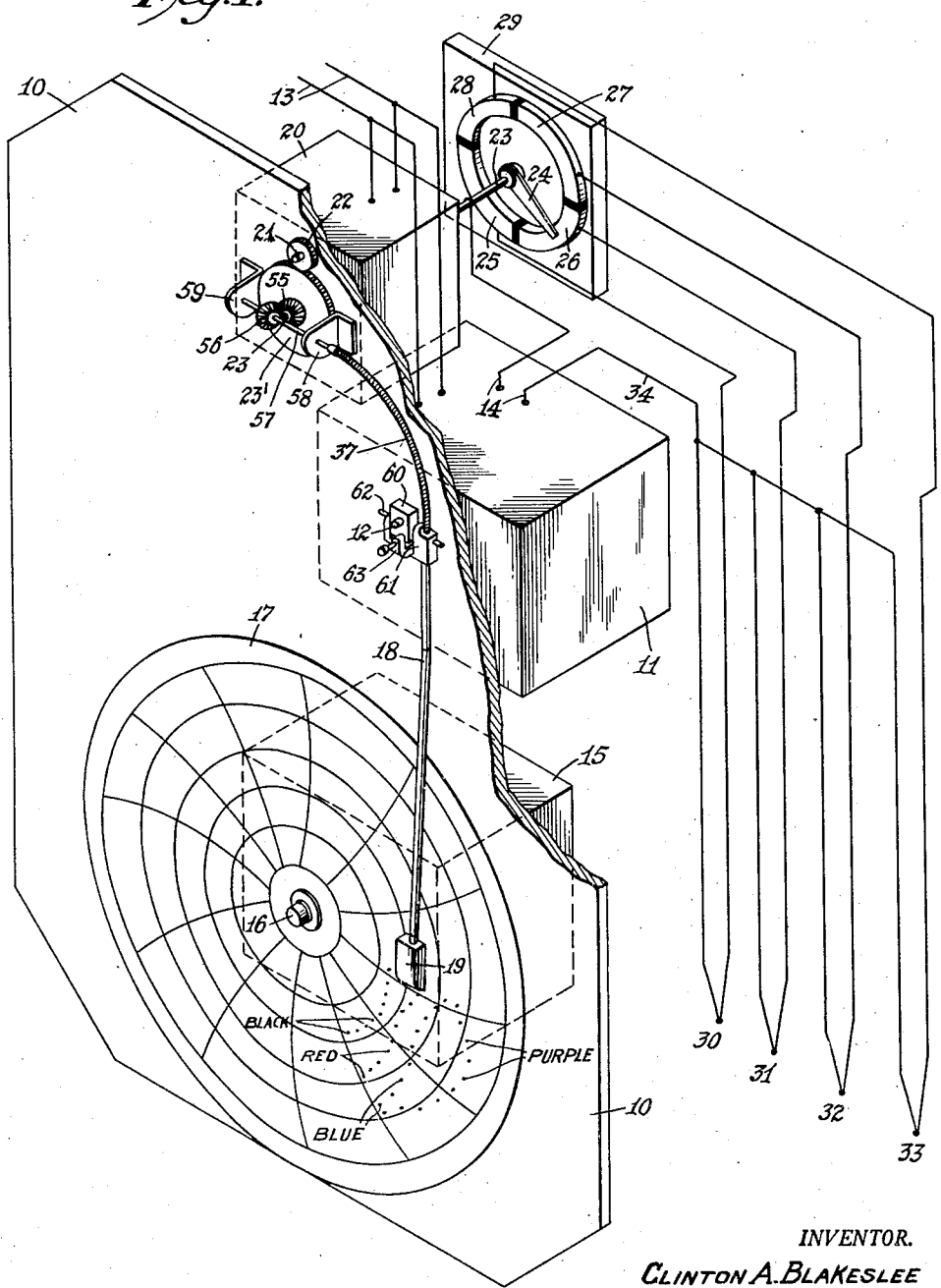
Fig. 1 is a perspective representation, partly in section, of an instrument embodying the principles of the invention as adapted to the measurement and recording of temperatures at four discrete locations.

Referring now to the drawings: The numeral 10 in Fig. 1 designates the base plate of a recording instrument adapted to provide on a circular chart a plurality of records of a corresponding number of more or less independent but similar variables, said base plate having a rearward face and a smooth front face adapted to form a backing or platen against which a paper chart may lie while having a record imprinted. Mounted upon the rearward face of the plate 10 is a measuring apparatus 11, which may be of well-known type, having a rotatable shaft 12 and adapted to position said shaft through a limited angle about its axis in response to changes in the value of a measured magnitude. In the measuring apparatus 11 a balancing motor operable by electric power derived from a source of supply comprising two conductors 13 acts to position the shaft 12 in correspondence with the value of an electromotive force applied to the measuring apparatus at terminals 14.

The measuring apparatus 11 may take the form of any one of a number of self-balancing units in which a balancing motor acts to position a rotatable shaft through a limited angle and thereby provide a measure of a variable electrical potential or the like whose value is required. As examples of instruments embodying this feature, there may be named the following U. S. Letters Patents: No. 1,727,494, issued September 10, 1929, to F. F. Uehling; No. 1,931,474, issued October 17, 1933, to J. D. Ryder; No. 2,189,430, issued December 26, 1939, to C. B. Moore et al.; and No. 2,250,712, issued July 29, 1941, to M. J. Johnson. These types of measuring elements are well known to the art, and being obtainable in many commercial forms, require no further explanation.

Mounted upon the rearward face of the plate 10 is a clock or timing motor 15 having projecting therefrom through the plate 10 a spindle 16 adapted for clamping engagement with a circular chart 17, whereby the latter may be caused to rotate about its center with a predetermined constant angular velocity. Carried by the shaft 12 and swingably mounted thereon for rotation through a limited angle in a plane perpendicular to the plate 10, is an extended arm 18 formed of rigid tubular material, and carrying upon its extremity a recording head 19 adapted to imprint upon the chart 17 a plurality of records in a manner presently to be set forth.

Mounted upon the rearward face of the plate 10 is a motor element 20 having a shaft 21 projecting forward through the plate 10, and carrying a gear 22. A shaft 23, projecting both forward through the plate 10, and backward to the rear of the motor element 20, carries a gear 23' meshing with the gear 22 on motor shaft 21, whereby the shaft 23 may be continuously driven at a constant velocity, in a counterclockwise sense as seen in the drawings, when said motor is energized from the electric power source 13. Upon the rearward end of the shaft 23 is fixed a contact arm 24 adapted to provide electrical contact selectively with four arcuate segments 25, 26, 27 and 28, concentrically mounted with respect to the shaft 23 and separated by insulating barriers, the assembly of said parts being carried by an insulating mounting plate 29 to constitute a multiple-point switch of the conventional dial type. Four thermocouples 30, 31, 32, and 33 are connected with one side of each couple to a common conductor 34, and with their free ends connected to the segments 25, 26, 27, and 28, respectively. The thermo-electric circuit is completed by the conductor 34 and the shaft 23 being connected to the terminals 14 of the measuring apparatus 11. There is thus provided a temperature measuring instrument adapted to deflect the arm 18 to an angular position representative of the temperature existing at whichever one of the four thermocouples 30, 31, 32 and 33 may be connected into the circuit by the arm 24 in its engagement with the segments of the dial switch. As shown in the drawing, the arm 24 is in contact with the segment 26, so that the angular position of the arm 18 will be representative of the temperature existing at the thermocouple 31.

The elements through which the recording head 19 imprints records upon the chart 17 will be understood by reference to Figs. 2 and 3, wherein are shown front and side elevations respectively of a recording head adapted to the purposes of the invention. Firmly attached to the swinging extremity of the arm 18 is a U-shaped frame 35 having journaled therein a shaft 36 with its axis perpendicular to that of the arm 18 and parallel to the plane of deflection of said arm. Passing through the hollow tubular arm 18 is a flexible shaft 37 adapted for rotation about its axis, and for bending through a limited angle with the swinging of the arm 18, and carrying a miter gear 38 meshing with a similar miter gear 39 fixed to the shaft 36. Swingably mounted upon the shaft 36 is a cradle 40 having journaled therein a shaft 41 rotatable about an axis parallel to that of the shaft 36 the axes of said two shafts lying in a common plane substantially parallel to the surface of the chart 17. A spur gear 42 fixed to the shaft 41 meshes with a similar spur gear 43 fixed to the shaft 36, so that when one of said shafts is caused to rotate through a given angle, the other shaft will be rotated through an equal angle in an opposite direction. Fixed to the shaft 36 is an inking wheel 44 having inserted in its periphery a number of ink pads 45 formed of absorbent material and adapted to be saturated with suitably colored inks for recording purposes. Fixed to the shaft 41 is a print wheel 46 having projecting radially therefrom marking members 47 adapted to receive ink from the pads 45 and, when brought into engagement with the surface of the chart 19, to imprint thereon indicia of corresponding distinguishing colors. Since the miter gears 38 and 39 are similar, and the spur gears 42 and 43 are similar, the rotation of the flexible shaft 37 through any given angle will cause the shafts 36 and 41 both to be rotated through the same angle, together with all elements carried thereby. Thus, if the pads 45 are evenly spaced about the periphery of the wheel 44, and the marking members 47 correspond in number with the pads 45 and are evenly spaced about the periphery of the print wheel 46, and these wheels are brought into register so that a particular marking member engages a particular pad, each of the other marking members will invariably engage an individual pad. Therefore, if the pads be charged with different colors of ink, each individual marking member will be adapted to imprint its record with a corresponding color.

Fixed to the shaft 41 is a cam member 48 having a number of lobes (in the present instance four) to correspond to the number of marking members carried by the print wheel 46. The conformation of the cam 48 (as clearly shown in Fig. 3), is similar to that of a ratchet, giving a slow rise and a sudden drop as the cam is rotated in a direction as indicated by the arrow A in Fig. 3. A rigid arm 49 fixed to the frame 35, and projecting therefrom, provides a surface for engagement with the periphery of the cam 48. A part 50 attached to the frame 35 and to the arm 18 projects away from the free extremity of said arm, and is formed to provide a support for two leaf springs 51 and 52, secured to the part 50, and engaging a movable part of the cradle 40. The proportioning, positioning and adjustment, of the spring 51 is such that it tends to rotate the cradle 40 about the axis of the shaft 36 in a sense to cause the shaft 41 and the elements carried thereby to approach the surface of the chart 17. The spring 52 is so proportioned and adjusted that, while not preventing deflection of the cradle 40 in a sense to cause the shaft 41 to approach the record chart 17, it is of sufficient strength to maintain the cradle 40 in such a position that none of the marking elements 47 can remain permanently in contact with the surface of the chart. For protection of the mechanism of the recording head there may be provided a cover plate 53 (shown in section in Fig. 3, but omitted from Fig. 2) attached to a suitable part of the frame 35.

Referring again to Fig. 1, the forward end of the shaft 23 carries a miter gear 55 meshing with a similar miter gear 56 fixed upon a shaft 57 horizontally journaled in bearings 58 and 59 with its axis perpendicular to that of the shaft 23, whereby said shaft will be caused to rotate with the same angular velocity as the shaft 23. The swingable mounting of the hollow arm 18 upon the forward end of the shaft 12 comprises a block 60 fixed to the shaft 12 and a yoke member 61 embracing said block member and rigidly carrying the arm 18 so that the hollow central part thereof terminates in an upwardly directed opening. A shaft or trunnion 62 passing through the yoke member 61 and into the block 60 in a sense perpendicular to both the shaft 12 and the extended arm 18, provides a bearing whereby said arm may be swung forward from the mounting plate of the instrument and the surface of the chart for purposes of changing charts or otherwise servicing the instrument. A stop member 63, limiting the angular deflection of the yoke 61 about the trunnion 62, constrains the arm 18 and the recording head 19 to swing in a definite plane parallel to, but out of contact with the surface of the chart 17. The flexible shaft 37, passing through the hollow arm 18, extends outward through the opening of the upper end of said arm and is curved through a suitable angle for operative engagement with the shaft 57, to which it is securely attached.

The operation of the multiple point recording mechanism as thus far set forth is as follows: Assuming all parts of the instrument to be in the positions shown in Figs. 1, 2, and 3, the arm 18 will have caused the recording head 19 to assume with respect to the graduations on the chart 17 a position representative of the temperature to which the thermocouple 31 is exposed. As the motor element 20 is operating continuously, the arm 24 will be travelling along the segment 26, but will remain in electrical contact therewith for a considerable interval of time. Rotation of the shaft 23 will be communicated through the miter gears 55 and 56 to the shaft 57, and thence by means of the flexible shaft 37 to the mechanism within the recording head 19. As shown in Figs. 2 and 3, the cam 48 has attained such a position with respect to the projecting arm 49 that said cam, together with its shaft and the print wheel carried thereby will be lifted to a position where the marking member 47 juxtaposed to the chart 17 will be supported out of contact with said chart, the cradle 40 swinging about the shaft 36 in opposition to the influence of the spring 51 to an extent sufficient to permit of such displacement. Upon the cam 48 rotating clockwise as seen in Fig. 3, through a small angle in advance of the position indicated, the abrupt edge of the lobe in engagement with the arm 49 will pass beyond the extremity of said arm, leaving the cradle 40 free to respond to the influence of the spring 51, whereupon said cradle and parts carried thereby will quickly be deflected about the axis of shaft 36, causing the said marking member 47 to strike the surface of the chart 17 and imprint thereon an indication characterized by the color of the ink with which said marking member has previously been charged from the corresponding ink pad 45, and having a position with respect to the graduations of the chart governed by the deflected position of the arm 18. Thus there will have been imprinted upon the chart a single dot or other suitable indication to provide with respect to the graduations of the chart a measure of the temperature to which the thermocouple 31 is exposed.

In order for the marking member 47 to come in contact with the surface of the chart 17 it is necessary that the cradle swing through such an angle as to engage and deflect the spring 52; but the inertia of the moving parts overcomes the influence of said spring 52, and the cradle does not come to rest until the marking member 47 has imprinted its record upon the chart. Upon the cradle 40 having been brought to rest, the influence of the spring 52 is sufficient to immediately restore said cradle and parts carried thereby to a position where the marking member will be lifted out of contact with the surface of the chart, thereby preventing blurring of the record as the recording head assumes a new deflected position with respect to the chart. As the rotation of the shaft 23 continues, the arm 24 will pass from engagement with the segment 26 of the dial switch over an insulated section, and will engage the segment 27, thereby disconnecting the thermocouple 31 from the measuring apparatus 11 and bringing the thermocouple 32 into operative relationship with said apparatus. The shaft 12 will thereupon be caused to assume an angular position about its axis representative of the temperature to which the thermocouple 32 is exposed, and the recording head 19 carried by the arm 18 will be correspondingly positioned with respect to the chart 17. In the meantime, through rotation of the shaft 37 and associated mechanism in the recording head 19, the print wheel 46 will have been rotated to a position wherein the marking element which previously engaged the chart 17 will be moved away from juxtaposition to said chart, and a succeeding marking element, freshly charged with ink from its corresponding ink pad on the inking wheel 44, will be approaching the surface of the chart 17. A lobe of the cam 48 will have engaged the rigid arm 49; and the cam, the shaft 41, and parts carried thereby will be raised to a position preparatory to imprinting a further record upon the chart. After a sufficient lapse of time to allow the recording head to come to rest in a position representative of the temperature under measurement, the lobe of the cam 48 in engagement with the arm 49 will pass through a position similar to that shown in Fig. 3, and will subsequently pass beyond the extremity of the arm 49, causing a suitable mark to be imprinted on the surface of the chart 17 in the manner hereinabove set forth, and a permanent record made of the temperature then existing at the thermocouple 32.

In a similar manner, the measuring mechanism is successively associated with the couples 33 and 39, and the marking members 47 successively brought into recording engagement with the chart 17 in positions corresponding to the temperatures measured by said couples, after which the mechanism completes a cycle of operation and the thermocouple 31 is again brought into measuring relationship with the instrument and a further element of the graph representing the temperature of that couple imprinted upon the chart. Because of the continuous advance of the chart by the clock 15 the last-printed element of the graph will have time-displacement with respect to the previously recorded element; and successive dots will combine to form a graphic record of the values under measurement. In this manner there will be caused to appear upon the surface of the chart 17 a group of records made up of elements characterized by color as representative of individual thermocouples, so that said records may readily be identified.

In Fig. 4 is shown a side elevation of an alternative form of recording head, interchangeable with that shown in Figs. 2 and 3, and adapted to actuation by electromagnetic rather than by mechanical means. A bracket 70, having a U-shaped part adapted to carry a shaft 71 similar to the shaft 36 shown in Figs. 2 and 3, and having a backwardly projecting portion adapted for mounting a small electromagnet, is securely fixed to the end of the hollow arm 18. Mounted in the U-shaped portion of the bracket 70 is the transverse shaft 71 carrying a miter gear 72, a spur gear 73 and an inking wheel not shown in the drawing, these parts being identical with the corresponding parts 39, 43, and 44 shown in Fig. 2. Also, mounted upon the shaft 71 is a cradle 75 adapted for rotation through a small angle about the shaft 71 and carrying a shaft 76 which in turn bears spur gear 77 and a printing wheel carrying marking members 78, said spur gear and printing wheel being similar in all respects to the corresponding parts 42 and 46 shown in Fig. 2. A miter gear 79 mounted upon the shaft 37 meshes with the miter gear 72; and the spur gears 73 and 77 mesh with each other, so that rotation of the shaft 37 will cause the shafts 71 and 76, together with the elements carried thereby, to rotate in a manner identical with the corresponding parts in the mechanism shown in Figs. 2 and 3. A backwardly projecting portion 80 of the cradle 75 has mounted thereon a small ferromagnetic armature 81; and an electromagnet 82 mounted upon the backwardly projecting part of the bracket 70 is adapted when energized to attract the armature 81 causing the cradle 75 to be tilted about the axis of the shaft 71, bringing a marking element 78 of the print wheel into recording engagement with the chart 17. A spring 83 extended between a suitable part of the cradle 75 and the bracket 70 tends to oppose the action of the electromagnet 82, normally maintaining the print wheel in a retracted position, and yielding to permit recording action to take place when the magnet 82 is energized.

In Fig. 6 is shown a device adapted to periodic and momentary energization of the electromagnet 82 for purposes of imprinting a record on the chart. Said device comprises two duplicate four-lobed cams 85 and 86 of a conformation similar to cam 48 shown in Fig. 3, each lobe of said cams being designed to give a slow rise and a sudden drop to a follower coacting therewith. Said cams, as shown, may be mounted on shaft 23. Mounted upon a fixed insulating block 87 are two extended leaf spring contact arms 68 and 89 adapted to engage the peripheries of the cams 85 and 86 respectively. Each of said contact arms carries an electrical contact; and these contacts are mutually disposed in such a manner that when the respective arms are in engagement with similar portions of the cam peripheries the contacts will be separated, and when the contact arm 88 engages a lower portion of a cam periphery than does the contact arm 89 the contacts will be in engagement and adapted to close an electrical circuit. The cams 85 and 86 are attached to the shaft 23 to have a slight relative angular displacement of corresponding parts, the cam 85 leading the cam 86 by a small angle so that as the shaft 23 is rotated in a counterclockwise sense as indicated by the arrow B in Fig. 6, the contacts will normally be maintained out of engagement as the contact arms 88 and 89 are simultaneously lifted by virtue of their actuation by the respectively associated cams 85 and 86. The cam 85 being set slightly in advance of the cam 86, the arm 88 will drop off the abruptly terminated rising contour of the cam, causing the contact carried by the arm 88 to be brought into engagement with that carried by the arm 89, completing an electrical circuit between said contact arms. A short interval of time after the drop of the arm 88, the duration of said interval being determined by the angular displacement of the cams 85 and 86, the arm 89 drops off the abruptly terminating portion of the cam 86, causing the contacts to be quickly separated. The combination of the cams 85 and 86 and the associated contact arms constitutes a quick-acting electric switch particularly adapted to the purposes of the invention and for which no novelty is herein claimed, a switch of similar design and operating characteristics being fully described and set forth in Swiss Patent No. 71,391, issued to Bergmann, January 3, 1916. The electromagnet 82 is diagrammatically shown in Fig. 6 as being connected to a battery 90 in series with the contacting mechanism hereinbefore described, and adapted to be energized upon the closing of said contacts. It will be obvious that by suitable relative positioning of the cams 85 and 86 the magnet 82 can be caused to be energized for as short a time interval as may be found expedient.

In Fig. 5 is shown a side elevation of a form of recording head similar to that shown in Fig. 4, but differing to the extent that, while it is magnetically actuated, the structure is materially simplified by virtue of the chart platen being utilized to form the armature of the magnet. For this purpose the base plate 10, upon which lies the chart 17, is formed of mild steel or similar ferromagnetic material. A bracket 95 having a U-shaped part adapted to carry a shaft 96 similar to the shaft 71 shown in Fig. 4, is securely fixed to the end of the hollow arm 18. Mounted on the shaft 96 are a miter gear 98, a spur gear 99 and an inking wheel not shown in the drawing, these parts being identical with the corresponding parts in Figs. 2 and 4. Also mounted upon the shaft 96 is a cradle 100 adapted for rotation through a small angle about the shaft 96 and carrying a shaft 101 parallel to the shaft 96 and in turn bearing a spur gear 102 similar to, and meshing with, the spur gear 99, and also a print wheel having marking elements 104, said parts being identical with the corresponding parts shown in Figs. 2 and 4. A miter gear 97 mounted upon the shaft 37 meshes with the miter gear 98, so that rotation of the shaft 37 will cause the shafts 97 and 101, together with elements carried thereby, to rotate in a manner identical with the corresponding parts in the mechanisms shown in Figs. 2, 3, and 4.

Mounted upon the cradle 100 and movable therewith is an electromagnet 105 preferably of horseshoe form and positioned in such a manner that its pole faces are normally juxtaposed to the surface of the chart 17 but separated therefrom by a distance slightly greater than that normally separating the marking elements 104 therefrom. Upon energization of the magnet 105 a force of attraction is developed between the pole faces of the same and the ferromagnetic base plate 10, whereby the magnet is pulled toward said plate, carrying with it the carriage 100 and all parts swinging therewith, so that the marking element is brought into contact with the face of the chart 17 and a record imprinted thereon. Return of the cradle to its retracted position is effected by means of a spring 106 extended between a suitable projecting part of said cradle and an attaching member 107 secured to the arm 18.

In Figs. 7 and 8 are shown electrical circuits which may be used interchangeably with the device illustrated in Fig. 6 for the purpose of momentarily sufficiently energizing the electromagnet of either of the recording heads shown in Figs. 4 and 5. In Fig. 7 a four-lobed cam 110 attached to the shaft 23 of the recording instrument is adapted to actuate a spring contact 111 engaging a contact 112, said contacts normally being in a closed relationship to complete an electrical circuit, and subject to opening for short periods as engaged by each lobe of the cam 110 in its revolution. A battery 113 is connected to energize an inductive element 114 through a resistor 115 which limits the flow of current through said inductive element. The circuit of said battery, inductive element, and resistor, is completed through the normally closed contacts 111 and 112. The winding of an electromagnet, which may be the magnet 82 shown in Fig. 4 or the magnet 105 shown in Fig. 5 is connected across the contacts 111 and 112, so that said contacts normally short circuit said winding. Under normal operation conditions current from the battery 113 will pass through the inductive element 114 maintaining a magnetic field therein. Upon separation of the contacts 111 and 112 by action of the cam 110 a portion of the energy stored in the field of the inductive element 114 will be discharged as a transient electric current through the winding of the electromagnet, momentarily together with the current from the battery energizing the same sufficiently to cause the recording head with which said magnet is associated to imprint a record on the chart of the instrument. Upon completion of the discharge, the electromagnet will become de-energized to a degree that under the influence of the opposed spring the cradle and the marking element will be withdrawn from recording engagement with the chart.

In Fig. 8 is shown an alternative form of electric circuit, wherein the discharge of a capacitor, rather than of an inductive element is used for momentarily energizing the printing magnet. A four-lobed cam 120 identical with the cam 110 shown in Fig. 7 is mounted upon the shaft 23. A spring contact 121 is adapted to be actuated by the lobes of the cam 120 and thereby caused momentarily to engage a contact 122 to cause an electrical circuit. A battery 123 is connected to a capacitor 124 in series with a resistor 125. An electromagnet, which corresponds to either the magnet 82 shown in Fig. 4 or the magnet 105 shown in Fig. 5, is connected across the terminals of the capacitor 124 in series with the normally open contacts 121 and 122. Under conditions where said contacts are separated, the capacitor 124 is maintained at the potential of the battery 123, and no current flows in the winding of the electromagnet. Upon completion of the magnet circuit by closing of said contacts, the capacitor 124 is discharged through the winding of said magnet, momentarily energizing the same and causing the recording head to be operated. Timing of the impulse delivered to the recording magnet by either of the circuits shown in Figs. 7 and 8 may be modified by adjustment of constants of the springs, the contacts, and the electrical network; and in some cases it may be practicable so to select resistance values in other parts of the network that the series resistor 115 or 125 may be eliminated from the circuit.

While in the embodiments so far described the shaft 57, the flexible shaft 37, and parts driven thereby, are disclosed as having continuous rotation, provision may be made to the end that the movement of these parts be periodic, and that the shifting action for purposes of changing the recording mechanism take place during only a small part of the total time available. This may be accomplished by replacing the gears 22 and 23', as shown in Fig. 1, by the elements of a Geneva train shown in Fig. 9. A star-wheel 130, having arcuate concave surfaces 131 alternating with radial slots 132 is fixed to the shaft 23. A disc 134, having a circumferential surface to fit the arcuate surfaces 131 of the star wheel 130, is fixed to the shaft 21 to be rotated thereby. An arm 135 also fixed to the shaft 21 carries a pin 136 adapted to engage one or other the slots 132 to rotate the star-wheel 130 through a relatively large angle while the disc 134 is passing through only a small part of its total revolution. An internally directly arcuately formed notch 137 in the periphery of the disc 134 provides clearance for the points of the star-wheel 130 during such time as said star-wheel is being rotated. The mechanism as thus described constitutes a Geneva train of the conventional type, for which no invention is herein claimed. It will be seen that with the Geneva gearing, while the shaft 21 may rotate continuously as driven by the motor 20, the shaft 23 driven by the star-wheel 130 will rotate intermittently, and will effect relatively large increments of its total rotation in relatively short periods of time. The rapid shift resulting from the employment of the Geneva gearing provides a positive operation of the dial switch and of the recording mechanism which may in some instances be desired.

It will be evident that various features of the invention are not restricted in practical utility to instruments of the circular chart type. This is particularly apparent with respect to the above-disclosed embodiments which provide for electromagnetic actuation of the printing mechanism.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for producing on a common movable chart individual records of the values of a plurality of variables, comprising means for supporting said chart, means for measuring said variables, an extended arm connected to said measuring means for deflection about an axis transverse to said chart through angles respectively representative of the magnitudes of said measured variables, printing means carried by said arm and adapted to print on said chart distinguishing indicia representing the respective variables, means controlling said measuring means for causing the latter to measure said variables periodically in predetermined sequence, means comprising an uninterrupted mechanical train between said controlling means and said indicia printing means for maintaining said indicia in register with the respective variables under measurement by said measuring means, and means for periodically impressing said printing means upon said chart, at points determined by the deflected positions of said arm.

2. Apparatus for producing on a common movable chart individual records of the values of a plurality of variables, comprising means for supporting said chart, means for measuring said variables, an extended arm pivotally mounted on an axis transverse to said chart, said arm being connected to said measuring means for movement through angles respectively representative of the magnitudes of said measured variables, a recording head carried by said arm and juxtaposed to said chart for recording on the surface of the same, said recording head comprising a frame rigidly secured to said arm and a cradle pivotally carried by said frame, a printing element movably mounted in said cradle and bearing a plurality of discrete indicia respectively corresponding to said variables, means controlling said measuring means for causing the latter to measure said variables periodically in predetermined sequence, means comprising an uninterrupted mechanical train for advancing said printing element in said cradle synchronously with the operation of said controlling means to present said indicia successively to said chart in correspondence with the respective variables under measurement, and means for periodically actuating said cradle to impress said printing element momentarily upon said chart.

3. In combination, supporting means for a movable chart, a frame, an inking wheel in said frame, a cradle pivoted on the axis of said inking wheel, a printing wheel in said cradle carrying spaced indicia adapted for engagement with said inking wheel, means normally maintaining said cradle in such position that said printing wheel indicia are out of engagement with said chart, means for measuring values of a plurality of variables, means controlling said measuring means for causing the latter to measure said variables periodically in predetermined sequence, a hollow arm pivoted about an axis transverse to said chart and carrying said frame, said arm being connected to said measuring means for positioning said arm through angular extents commensurate with values of said variables, means comprising a flexible shaft passing through said hollow arm for rotating said inking wheel and for rotating said printing wheel in timed relation with said selecting means to bring opposite said chart indicia corresponding to the selected variables, and means for actuating said cradle to bring said printing wheel into contact with said chart.

4. In a recording instrument, the combination of supporting means for a movable chart, means for measuring the magnitudes of a plurality of variables, means for periodically associating said measuring means with said variables to measure the same in predetermined sequence, an arm connected to said measuring means for deflection about an axis transverse to said chart through angles respectively representative of the magnitudes of the measured variables, printing means carried by said arm and adapted to print on said chart distinguishing indicia representing the respective variables, means comprising an uninterrupted mechanical train including a rotatable flexible shaft for maintaining said indicia in register with corresponding connected variables, and means for periodically impressing said printing means upon said chart at points determined by the deflected positions of said arm.

5. In a recording instrument, the combination of supporting means for a movable chart, means for measuring the magnitudes of a plurality of variables, means for periodically associating said measuring means with said variables to measure the same in predetermined sequence, a hollow arm connected to said measuring means for deflection about an axis transverse to said chart through angles respectively representative of the magnitudes of the measured variables, printing means carried by said arm and adapted to print on said chart distinguishing indicia representing the respective variables, means comprising an uninterrupted mechanical train including a rotatable flexible shaft enclosed within said hollow arm for maintaining said indicia in register with corresponding connected variables, and means for periodically impressing said printing means upon said chart at points determined by the deflected positions of said arm.

6. Apparatus for producing on a common movable chart individual records of the values of a plurality of variables, comprising means for supporting said chart, means for measuring said variables, an extended arm pivotally mounted on an axis transverse to said chart, said arm being connected to said measuring means for movement through angles respectively representative of the magnitudes of said measured variables, a recording head carried by said arm and juxtaposed to said chart for recording on the surface of the same, said recording head comprising a frame rigidly secured to said arm and a cradle pivotally carried by said frame, a printing element movably mounted in said cradle and bearing a plurality of discrete indicia respectively corresponding to said variables, means periodically associating said measuring means with said variables to measure the same in predetermined sequence, means comprising an uninterrupted mechanical train for advancing said printing element in said cradle synchronously with the operation of said associating means to present said indicia successively to said chart in correspondence with the respective variables under measurement, and means for periodically actuating said cradle to impress said printing element momentarily upon said chart.

7. Apparatus for producing on a common movable chart individual records of the values of a plurality of variables, comprising means for supporting said chart, means for measuring said variables, an extended arm pivotally mounted on an axis transverse to said chart, said arm being connected to said measuring means for movement through angles respectively representative of the magnitudes of said measured variables, a recording head carried by said arm and juxtaposed to said chart for recording on the surface of the same, said recording head comprising a frame rigidly secured to said arm and a cradle pivotally carried by said frame, a printing element movably mounted in said cradle and bearing a plurality of discrete indicia respectively corresponding to said variables, means periodically associating said measuring means with said variables to measure the same in predetermined sequence, means comprising an uninterrupted mechanical train including a flexible rotatable shaft for advancing said printing element in said cradle synchronously with the operation of said associating means to present said indicia successively to said chart in correspondence with the respective variables under measurement, and means for periodically actuating said cradle to impress said printing element momentarily upon said chart.

8. Apparatus for producing on a common movable chart individual records of the values of a plurality of variables, comprising means for supporting said chart, means for measuring said variables, an extended arm pivotally mounted on an axis transverse to said chart, said arm being connected to said measuring means for movement through angles respectively representative of the magnitudes of said measured variables, a recording head carried by said arm and juxtaposed to said chart for recording on the surface of the same, said recording head comprising a frame rigidly secured to said arm and a cradle pivotally carried by said frame, a printing element movably mounted in said cradle and bearing a plurality of discrete indicia respectively corresponding to said variables, means periodically associating said measuring means with said variables to measure the same in predetermined sequence, means comprising a flexible shaft rotatable with time only for advancing said printing element in said cradle synchronously with the operation of said associating means to present said indicia successively to said chart in correspondence with the respective variables under measurement, and means for periodically actuating said cradle to impress said printing element momentarily upon said chart.

9. Apparatus for producing on a common movable chart individual records of the values of a plurality of variables, comprising means for supporting said chart, means for measuring said variables, an extended arm connected to said measuring means for deflection about an axis transverse to said chart through angles respectively representative of the magnitudes of said measured variables, a frame carried by said arm, a cradle pivotally carried by said frame, printing means mounted in said cradle and adapted to print on said chart distinguishing indicia representing the respective variables, means controlling said measuring means for causing the latter to measure said variables periodically in predetermined sequence, means for advancing said printing means in said cradle synchronously with the operation of said controlling means to present said indicia successively to said chart in correspondence with the respective variables under measurement, and means carried by said frame and adapted to coact with said cradle for operating the latter to impress said printing means upon said chart.

CLINTON A. BLAKESLEE.

REFERENCES CITED

The following references are of record in the file of this patent:

UNITED STATES PATENTS

| Number | Name | Date |
| --- | --- | --- |
| 2,052,910 | Villiers | Sept. 1, 1936 |
| 1,967,900 | Perry et al. | July 24, 1934 |
| 2,099,965 | Sarazin | Nov. 23, 1937 |
| 2,118,081 | Grisdale | Sept. 1, 1938 |
| 2,171,327 | Anderson | Aug. 29, 1939 |
| 2,191,673 | Moore | Feb. 27, 1940 |
| 2,251,632 | Neal | Aug. 5, 1941 |
| 2,291,475 | Kellogg et al. | July 28, 1942 |
| 2,346,883 | Wait | Apr. 18, 1944 |